(12) United States Patent
Weng (10) Patent No.: US 12,254,145 B2
(45) Date of Patent: Mar. 18, 2025

(54) TOUCH DISPLAY DEVICE

(71) Applicant: CARUX TECHNOLOGY PTE. LTD., Singapore (SG)

(72) Inventor: Tsan-Po Weng, Miao-Li County (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 29 days.

(21) Appl. No.: 17/821,622

(22) Filed: Aug. 23, 2022

(65) Prior Publication Data

US 2023/0094326 A1 Mar. 30, 2023

Related U.S. Application Data

(60) Provisional application No. 63/249,635, filed on Sep. 29, 2021.

(30) Foreign Application Priority Data

Jul. 14, 2022 (CN) .......................... 202210833645.8

(51) Int. Cl.
*G06F 3/041* (2006.01)
*G09G 3/20* (2006.01)

(52) U.S. Cl.
CPC .......... *G06F 3/0412* (2013.01); *G06F 3/0416* (2013.01); *G09G 3/2096* (2013.01); *G09G 2330/021* (2013.01); *G09G 2330/06* (2013.01); *G09G 2354/00* (2013.01); *G09G 2370/00* (2013.01)

(58) Field of Classification Search
CPC ... G06F 3/0412; G06F 3/0416; G09G 3/2096; G09G 2330/021; G09G 2330/06; G09G 2354/00; G09G 2370/00
See application file for complete search history.

(56) References Cited

U.S. PATENT DOCUMENTS 8,860,888 B2 10/2014 Kobayashi et al.
9,437,129 B2 9/2016 Lee et al.
(Continued)

FOREIGN PATENT DOCUMENTS

CN 1288878 C 12/2006
CN 101887303 A 11/2010
(Continued)

OTHER PUBLICATIONS

Chinese language office action dated Aug. 28, 2023, issued in application TW 111126400.

*Primary Examiner* — Temesghen Ghebretinsae
*Assistant Examiner* — Sosina Abebe
(74) *Attorney, Agent, or Firm* — McClure, Qualey & Rodack, LLP (57) ABSTRACT

A touch display device includes a touch display panel, a timing-control circuit board, and a first driving circuit board. The timing-control circuit board outputs first display data. The first driving circuit board is electrically coupled between the touch display panel and the timing-control circuit board. The first driving circuit board includes a first interface and a second interface. The first interface receives the first display data from the timing-control circuit board. The second interface outputs first touch data to the timing-control circuit board. The first interface and the second interface are differential signal interfaces.

17 Claims, 4 Drawing Sheets

(56) References Cited

U.S. PATENT DOCUMENTS

| | | | |
|---|---|---|---|
| 9,857,911 B1* | 1/2018 | Qu | G06F 3/044 |
| 10,818,241 B2 | 10/2020 | Kim et al. | |
| 11,257,439 B2 | 2/2022 | Guo et al. | |
| 11,295,655 B2 | 4/2022 | Ji et al. | |
| 2010/0149082 A1* | 6/2010 | Hong | G09G 3/3611 |
| | | | 345/99 |
| 2015/0213751 A1* | 7/2015 | Lee | G09G 3/2085 |
| | | | 345/212 |
| 2016/0026331 A1* | 1/2016 | Chen | G06F 3/041661 |
| | | | 345/174 |
| 2018/0059832 A1* | 3/2018 | Cho | G06F 3/0443 |
| 2019/0121476 A1 | 4/2019 | Jang et al. | |
| 2021/0174749 A1* | 6/2021 | Guo | G06F 3/0416 |
| 2021/0191555 A1* | 6/2021 | Jo | G09G 3/3685 |
| 2021/0397327 A1* | 12/2021 | Lee | G06F 3/0412 |
| 2022/0036786 A1* | 2/2022 | Ji | G09G 3/20 |
| 2022/0139325 A1* | 5/2022 | Lee | G06F 3/147 |
| | | | 345/694 |

FOREIGN PATENT DOCUMENTS

| | | | |
|---|---|---|---|
| CN | 109994068 A | 7/2019 | |
| CN | 111833797 A | 10/2020 | |
| TW | 201532017 A | 8/2015 | |
| WO | 2019/205735 A1 | 10/2019 | |

* cited by examiner

TOUCH DISPLAY DEVICE

CROSS REFERENCE TO RELATED APPLICATIONS

This application claims the benefit of Provisional Application No. 63/249,635, filed on Sep. 29, 2021, and China Application No. 202210833645.8, filed on Jul. 14, 2022, the entirety of which is incorporated by reference herein.

BACKGROUND OF THE DISCLOSURE

Field of the Invention

The present disclosure relates to an electronic device, and, in particular, to a touch display device.

Description of the Related Art

As the size of displays becomes larger and larger, the distances covered by the internal wiring of such displays becomes longer and longer. In current applications, digital signals in the traces inside a display are transmitted using digital signals with amplitudes of 0V to 3V. As the traces inside the display are getting longer and longer, the issues of power consumption and electromagnetic interference (EMI) caused by the transmission of the digital signals in the traces are becoming more and more serious. Therefore, how to eliminate the EMI problem caused by the transmission of digital signals has become an important issue.

BRIEF SUMMARY OF THE DISCLOSURE

An embodiment of the present disclosure provides a touch display device. The touch display device includes a touch display panel, a timing-control circuit board, and a first driving circuit board. The timing-control circuit board outputs first display data. The first driving circuit board is electrically coupled between the touch display panel and the timing-control circuit board. The first driving circuit board includes a first interface and a second interface. The first interface receives the first display data from the timing-control circuit board. The second interface outputs first touch data to the timing-control circuit board. The first interface and the second interface are differential signal interfaces.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

Figure 1:
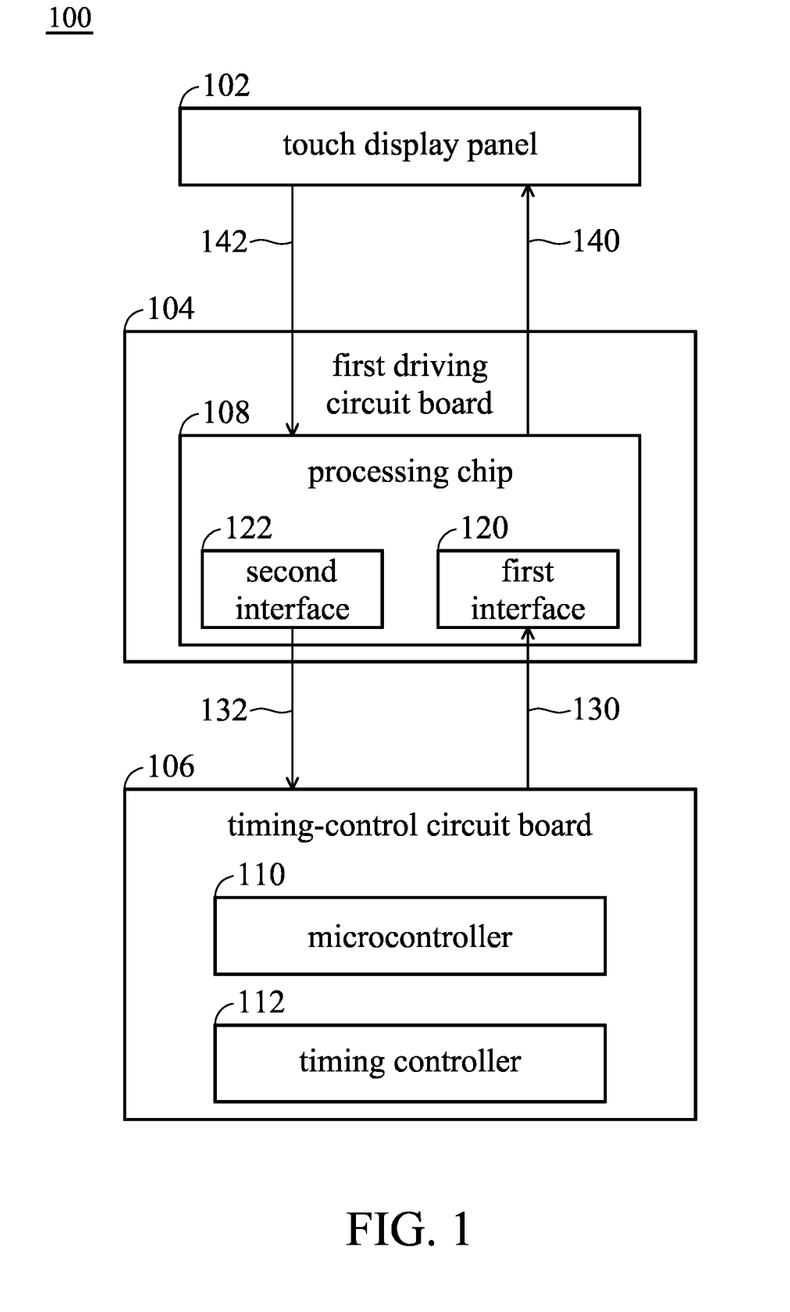
FIG. 1 is schematic diagram of a touch display device 100 in accordance with some embodiments of the present disclosure.

The touch display device 100 shown in FIG. 1 of the present disclosure is applied to a vehicle electronic device. The technical content of the touch display device 100 disclosed in the present disclosure can be used in any suitable type of display device or electronic device having a display panel. The electronic device in the present disclosure may include a display device, a backlight device, an antenna device, a sensing device, or a splicing device, etc., but is not limited thereto. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat, or ultrasonic waves, but is not limited thereto. The electronic components may include passive and active components, such as capacitors, resistors, inductors, diodes, transistors, and the like. The diodes may include light-emitting diodes or photodiodes. The light-emitting diode may include organic light-emitting diode (OLED), inorganic light-emitting diode, micro-LED, mini-LED, quantum dot light-emitting diode (QLED, QDLED), other suitable materials or a combination of the above materials, but is not limited thereto. The splicing device may be, for example, a splicing display device or a splicing antenna device, but is not limited thereto. In addition, the display device in the electronic device may be a color display device or a monochrome display device, and the shape of the electronic device may be rectangular, circular, polygonal, a shape with curved edges, or other suitable shapes. In addition, the electronic device described below uses, as an example, the sensing of a touch through an embedded touch device, but the touch-sensing method is not limited thereto, and another suitable touch-sensing method can be used provided that it meets all requirements.

FIG. 1 is schematic diagram of a touch display device 100 in accordance with some embodiments of the present disclosure. As shown in FIG. 1, the touch display device 100 includes a touch display panel 102, a first driving circuit board 104, and a timing-control circuit board 106. In some embodiments, the touch display panel 102 can detect the touch action from the user and generate a touch signal 142 correspondingly. The first driving circuit board 104 includes a processing chip 108. The processing chip 108 includes a first interface 120 and a second interface 122. The processing chip 108 converts the touch signal 142 from the touch display panel 102 into first touch data 132, and sends the first touch data 132 to the timing-control circuit board 106 through the second interface 122. The processing chip 108 converts the first display data 130 from the timing-control circuit board 106 into a display-driving signal 140 through the first interface 120, and sends the display-driving signal 140 to the touch display panel 102. In some embodiments, the processing chip 108 is an analog touch display integration (ATDI) chip, but the present disclosure is not limited thereto. In some embodiments, the timing-control circuit board 106 includes a microcontroller 110 and a timing controller 112.

The processing chip 108 receives the first display data 130 from the timing-control circuit board 106 through the first interface 120, converts the first display data 130 into the display-driving signal 140, and sends the display-driving signal 140 to the touch display panel 102. In some embodiments, the first interface 120 and the second interface 122 are differential signal interfaces. In some embodiments, the differential signal interfaces are a point-to-point interface, a low voltage differential signal (LVDS) interface, or an embedded display port interface, but the present disclosure is not limited thereto. In some embodiments, the first interface 120 is the point-to-point interface, the second interface 122 is the LVDS interface, but the present disclosure is not limited thereto.

According to some embodiments, the driving circuit board includes a first interface and a second interface. The first interface is used to receive the display data from the timing-control circuit board, and the second interface is used to output the touch data to the timing-control circuit board. Since the first interface and the second interface are differential signal interfaces, the power consumption and electromagnetic interference (EMI) problems caused during the data transmission process can be greatly reduced.

Figure 2:
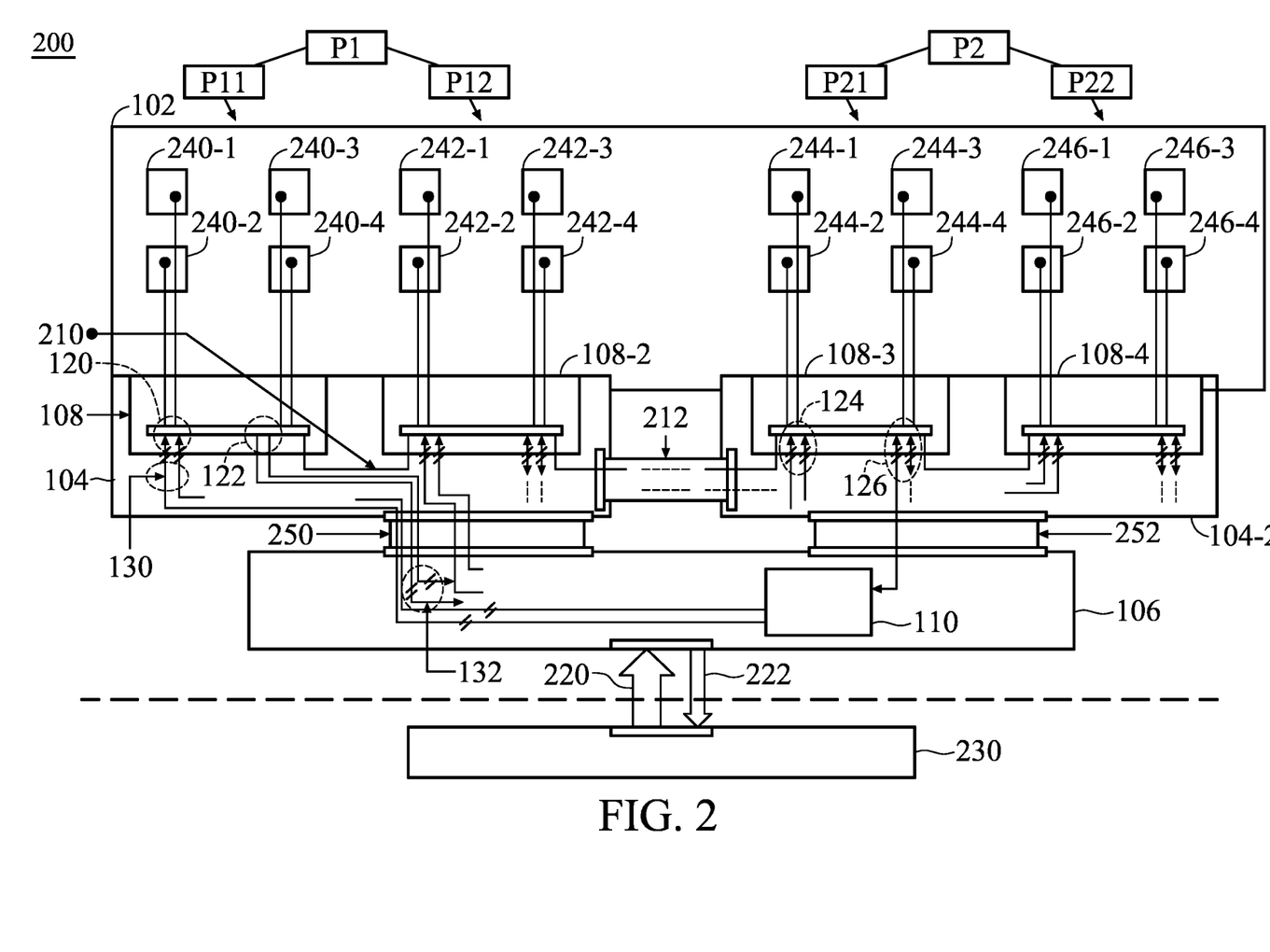
FIG. 2 is a schematic diagram of a touch display device 200 in accordance with some embodiments of the present disclosure.

FIG. 2 is a schematic diagram of a touch display device 200 in accordance with some embodiments of the present disclosure. As shown in FIG. 2, the touch display device 200 includes the touch display panel 102, the first driving circuit board 104, a second driving circuit board 104-2, the timing-control circuit board 106. The processing chip 108 and a processing chip 108-2 are disposed on the first driving circuit board 104. The processing chip 108 is electrically connected to the processing chip 108-2 through wires 210 on the first driving circuit board 104. A processing chip 108-3 and a processing chip 108-4 are disposed on the second driving circuit board 104-2. The processing chip 108-3 is electrically connected to the processing chip 108-4 through the wires on the second driving circuit board 104-2. In some embodiments, the first driving circuit board 104 is electrically connected to the second driving circuit board 104-2 through a flexible cable 212. The first driving circuit board 104 is electrically connected to the timing-control circuit board 106 through a flexible cable 250. The second driving circuit board 104-2 is electrically connected to the timing-control circuit board 106 through a flexible cable 252.

In some embodiments, as shown in FIG. 2, the first driving circuit board 104 outputs the first display-driving signal (for example, the display-driving signal 140 in FIG. 1) to the first part P1 of the touch display panel 102, and the second driving circuit board 104-2 outputs the second display-driving signal to the second part P2 of the touch display panel 102. In some embodiments, the touch display panel 102 includes a plurality of touch sensing units. In some embodiments, the first part P1 of the touch display panel 102 can be subdivided into a first sub-part P11 and a second sub-part P12. The second part P2 of the touch display panel 102 can be subdivided into a third sub-part P21 and a fourth sub-part P22. For example, the sensing units located in the first sub-part P11 of the touch display panel 102 include a sensing unit 240-1, a sensing unit 240-2, a sensing unit 240-3, and a sensing unit 240-4. The sensing units located in the second sub-part P12 of the touch display panel 102 include a sensing unit 242-1, a sensing unit 242-2, a sensing unit 242-3, and a sensing unit 242-4. The sensing units located in the third sub-part P21 of the touch display panel 102 include a sensing unit 244-1, a sensing unit 244-2, a sensing unit 244-3, and a sensing unit 244-4. The sensing units located in the fourth sub-part P22 of the touch display panel 102 include a sensing unit 246-1, a sensing unit 246-2, a sensing unit 246-3, and a sensing unit 246-4.

The processing chip 108 may receive the touch signals (e.g., the touch signal 142 in FIG. 1) from the sensing unit 240-1, the sensing unit 240-2, the sensing unit 240-3, and the sensing unit 240-4 in the first sub-part P11. The processing chip 108-2 may receive the touch signals from the sensing unit 242-1, the sensing unit 242-2, the sensing unit 242-3, and the sensing unit 242-4 in the second sub-part P12. The processing chip 108-3 may receive the touch signals from the sensing unit 244-1, the sensing unit 244-2, the sensing unit 244-3, and the sensing unit 244-4 in the third sub-part P21. Similarly, the processing chip 108-4 may receive the touch signals from the sensing unit 246-1, the sensing unit 246-2, the sensing unit 246-3, and the sensing unit 246-4 in the fourth sub-part P22. Although in some embodiments of FIG. 2, a single processing chip is electrically connected to four sensing units, the present disclosure does not limit the number of sensing units connected to a single processing chip. In some embodiments, the touch display panel 102 further includes a plurality of display units (not shown). The display units may display the corresponding screen according to the display-driving signal (e.g., the display-driving signal 140 in FIG. 1) from the processing chip 108. In some embodiments, the touch display panel 102 may be a splicing combination of a display panel and a touch panel. In some embodiments, the touch display panel 102 may be an in-cell touch panel.

In some embodiments, as shown in FIG. 2, taking the processing chip 108 on the first driving circuit board 104 as an example, the processing chip 108 receives the first display data 130 from the microcontroller 110 of the timing-control circuit board 106 through its first interface 120. On the other hand, the processing chip 108 converts the touch signals (for example, touch signal 142) from sensing unit 240-1, sensing unit 240-2, sensing unit 240-3, and sensing unit 240-4 into the first touch data 132. The processing chip 108 sends the first touch data 132 to the microcontroller 110 through its second interface 122 for subsequent processing. Similarly, the processing chip 108-3 on the second driving circuit board 104-2 receives the second display data (not shown) from the microcontroller 110 in the timing-control circuit board 106 through its third interface 124 (the same as the first interface 120 of the processing chip 108). On the other hand, the processing chip 108-3 converts the touch signals (not shown) from sensing unit 244-1, sensing unit 244-2, sensing unit 244-3, and sensing unit 244-4 into second touch data (not shown). The processing chip 108-3 sends the second touch data to the microcontroller 110 through its fourth interface 126 for subsequent processing. In addition, the processing chip 108-2 and the processing chip 108-4 may include the same or similar components as the processing chip 108, and perform the same or similar signal processing, the description of which will not be repeated herein.

In some embodiments, the microcontroller 110 may integrate the first touch data 132 from processing chip 108, processing chip 108-2, processing chip 108-3, and processing chip 108-4. The microcontroller 110 generates a touch report 222 according to the first touch data 132. The microcontroller 110 sends the touch report 222 to a host 230 for subsequent application by the host 230. The microcontroller 110 may receive the image signals 220 from the host 230, and convert the image signals 220 into the first display data 130 for the processing chip 108 to receive through its first interface 120. In some embodiments, the host 230 may be, for example, a central processing unit in an in-vehicle system, but the present disclosure is not limited thereto.

Figure 3:
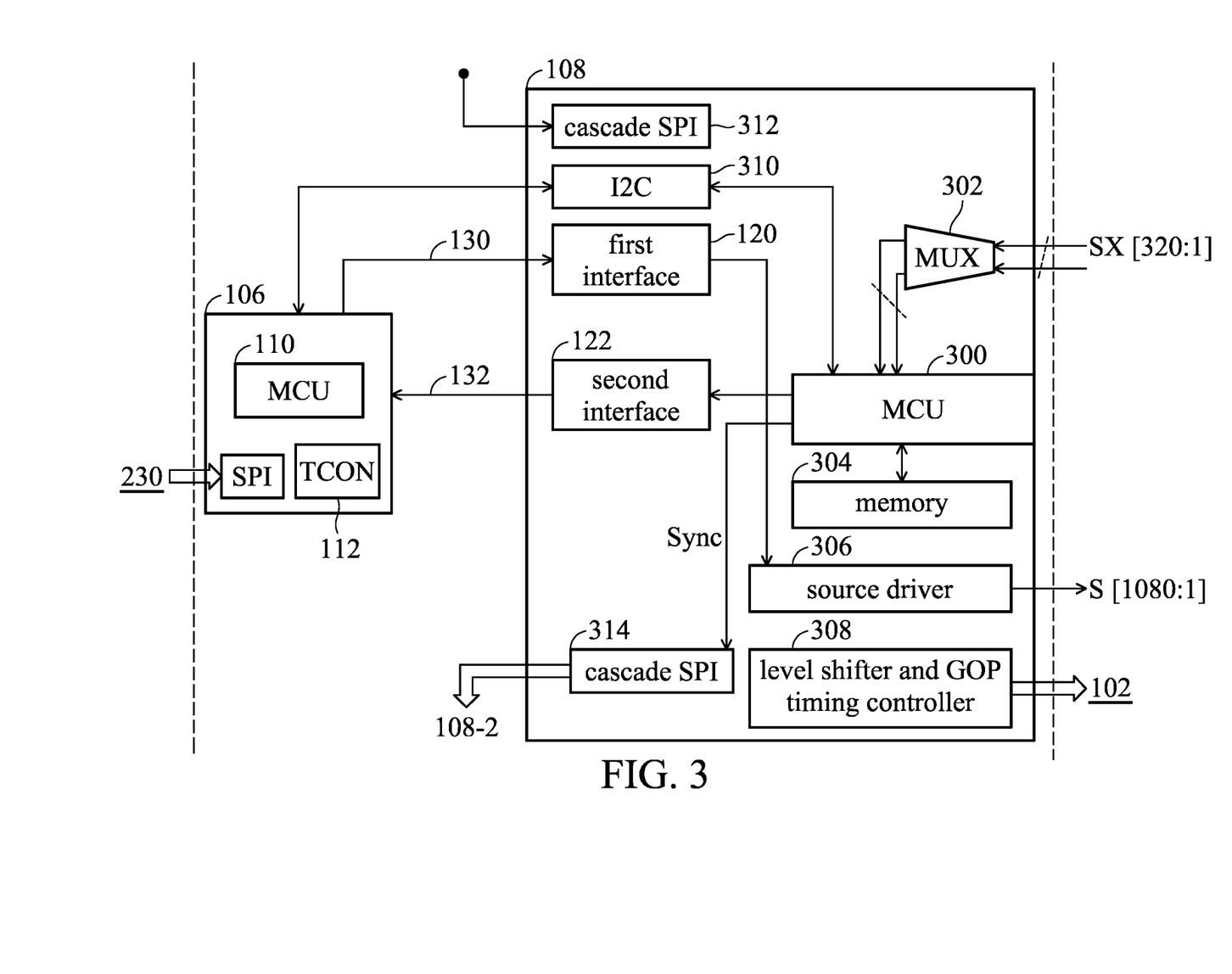
FIG. 3 is a detailed schematic diagram of a processing chip 108 of the touch display device 100 in FIG. 1 in accordance with some embodiments of the present disclosure.

FIG. 3 is a detailed schematic diagram of a processing chip 108 of the touch display device 100 in FIG. 1 in accordance with some embodiments of the present disclosure. As shown in FIG. 3, the processing chip 108 includes a microcontroller (MCU) 300, a multiplexer (MUX) 302, a memory 304, a source driver 306, a level shifter and GOP timing controller 308, an inter-integrated circuit (I2C) interface 310, a first interface 120 (for example, a point-to-point interface), a second interface 122 (for example, an LVDS interface), a cascade serial peripheral interface (SPI) 312, and a cascade SPI 314. In some embodiments, the multiplexer 302 receives the touch signal SX[320:1] from the touch display panel 102, and sends the touch signal SX[320:1] to the microcontroller 300 correspondingly in sequence. The microcontroller 300 converts the touch signal SX[320:1] into the first touch data 132, and sends the first touch data 132 to the microcontroller 110 in the timing-controller circuit board 106 through the second interface 122. Then, the microcontroller 110 generates a touch report (e.g., the touch report 222 in FIG. 2) according to the first touch data 132. The touch report may be sent to the host 230 for subsequent processing.

In some embodiments, the microcontroller 110 of the timing-control circuit board 106 receives the image signals (for example, the image signals 220 in FIG. 2) from the host 230 through an SPI interface. The microcontroller 110 converts the image signals into the first display data 130, and sends the first display data 130 to the processing chip 108. The timing controller (TCON) 112 is used to configure the timing of the image signals. The processing chip 108 receives the first display data 130 through the first interface 120. The source driver 306 outputs the display-driving signal S[1080:1] to the touch display panel 102 correspondingly according to the first display data 130. In some embodiments, the level shifter and GOP timing controller 308 is used to configure the voltage level and timing of the display-driving signal S[1080:1]. In some embodiments, the memory 304 may store setup parameters used to initialize the processing chip 108. When the initialization of the processing chip 108 performs a reset, the microcontroller 300 may read the setting parameters in the memory 304 to perform initialization.

In some embodiments, the cascade SPI 312 may receive timing information, touch information, and display driving information from an adjacent processing chip (not shown). The cascade SPI 314 may send the timing information, the touch information, and the display driving information of the processing chip 108 to the processing chip 108-2. In some embodiments, the microcontroller 300 may send a synchronization signal Sync to the cascade SPI 314, so that the adjacent processing chip 108-2 can obtain the timing information, the touch information, and the display driving information of the processing chip 108. In some embodiments, the processing chip 108 may receive an interrupt signal and a reset signal from the microcontroller 110 in the timing-control circuit board 106 through the I2C interface 310, but the present disclosure is not limited thereto.

Figure 4A:
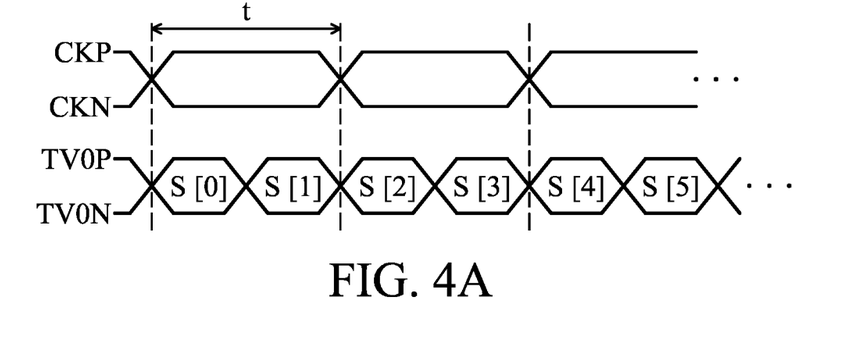
FIGS. 4A, 4B and 4C are waveform diagrams of first display data 130 and/or first touch data 132 transmitted by the touch display device 100 in FIG. 1 in accordance with some embodiments of the present disclosure.
Figure 4B:
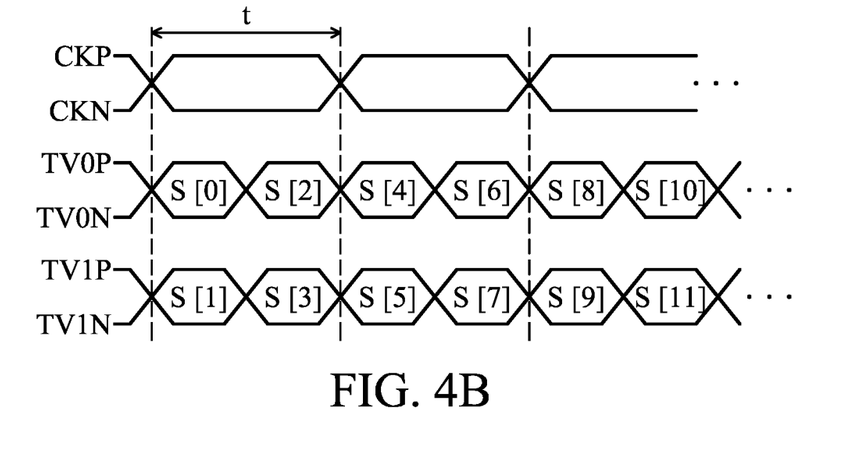
Figure 4C:
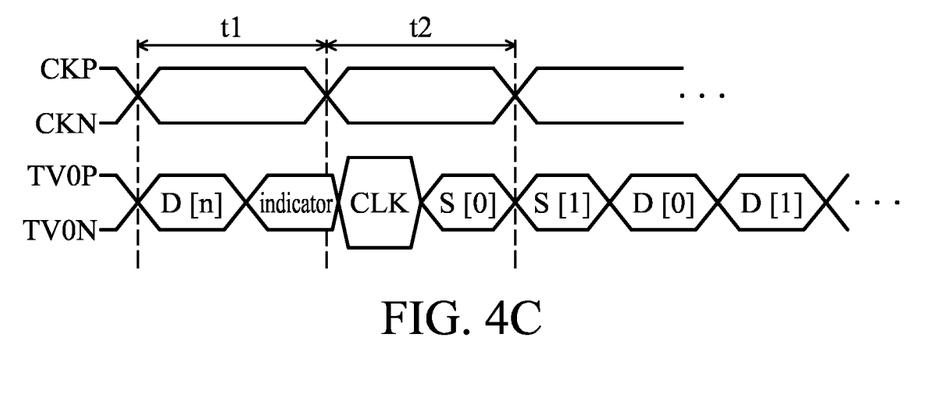

FIGS. 4A, 4B and 4C are waveform diagrams of first display data 130 and/or first touch data 132 transmitted by the touch display device 100 in FIG. 1 in accordance with some embodiments of the present disclosure. The touch display device 100 sends the first display data 130 and/or the first touch data 132 through a differential signal interface (e.g., the first interface 120 and the second interface 122). As shown in FIG. 4A, the differential signal interface sends the first display data 130 and/or the first touch data 132 through a pair of clock signals (that is, the clock signal CKP and the clock signal CKN) and at least one pair of data signals (that is, the data signal TVOP and the data signal TVON). That is, the differential signal interface may send the first display data 130, the first touch data 132, or both through the clock signals (i.e., clock signal CKP and clock signal CKN) and the data signals (i.e., data signal TVOP and data signal TVON). According to some embodiments, data signal TVOP and data signal TVON may carry the first display data 130 and/or the first touch data 132. For example, in FIG. 4A, the data signal TVOP and data signal TVON carry touch data S[0], touch data S[1], touch data S[2], touch data S[3], touch data S[4], and touch data S[5]. In some embodiments of FIG. 4A, data (e.g., the touch data S[0] and the touch data S[1]) can be sent in one clock period t. In some embodiments, the amplitude of the clock signal CKP, the clock signal CKN, the data signal TVOP, and the data signal TVON may be 150 mV to 450 mV.

As shown in FIG. 4B, the differential signal interface of the touch display device 100 sends the first display data 130 and/or the first touch data 132 through a pair of clock signal (that is, the clock signal CKP and the clock signal CKN) and two pairs of data signals (that is, the data signal TVOP, the data signal TVON, the data signal TV1P, and the data signal TV1N). The data signal TVOP, the data signal TVON, the data signal TV1P, and the data signal TV1N may carry the first display data 130 and/or the first touch data 132. For example, in FIG. 4B, the data signal TVOP and the data signal TVON carry the touch data S[0], the touch data S[2], the touch data S[4], the touch data S[6], the touch data S[8], and the touch data S[10]. The data signal TV1P and the data signal TV1N carry the touch data S[1], the touch data S[3], the touch data S[5], the touch data S[7], the touch data S[9], and the touch data S[11]. In some embodiments of FIG. 4B, four data (e.g., the touch data S[0], the data S[1], the touch data S[2], and the touch data S[3]) can be sent in one clock period t. In some embodiments, the amplitude of the clock signal CKP, the clock signal CKN, the data signal TVOP, the data signal TVON, the data signal TV1P, and the data signal TV1N may be 150 mV to 450 mV. The present disclosure does not limit the number of data carried by a signal clock period. In short, when the differential signal interface (such as the first interface 120 and the second interface 122 in FIG. 1) includes a pair of data signals, the pair of data signals can send N display data or N touch data in a signal clock period of the pair of clock signals. When differential signal interface (such as the first interface 120 and the second interface 122 in FIG. 1) includes two pairs of data signals, the two pairs of data signals can send 2N display data or 2N touch data in a signal clock period of the pair of clock signals. N is a positive integer.

As shown in FIG. 4C, the differential interface of touch display device 100 sends the first display data 130 and/or the first touch data 132 through a pair of clock signals (that is, the clock signal CKP and the clock signal CKN) and a pair of data signals (that is, the data signal TVOP and the data signal TVON). The data signal TVOP and the data signal TVON can carry the first display data 130 and the first touch data 132 at the same time. For example, in FIG. 4C, the data signal TVOP and the data signal TVON carry the display data D[n], the touch data S[0], the touch data S[1], the display data D[0], and the display data D[1].

In some embodiments, in the clock period t2, the data signal TVOP and the data signal TVON can further carry the clock data CLK, and the amplitude of the clock data CLK can be correspondingly set according to the subsequent data content. For example, when the data content after the clock data CLK includes both the display data and the touch data, the present disclosure may set the amplitude of the clock data CLK to be 450 mV. For example, when the data content after the clock data CLK is all display data, the present disclosure may set the amplitude of the clock data CLK to be 300 mV. In some embodiments, in the clock period t1, the data signal TVOP and the data signal TVON further carry an indicator. The indicator may also indicate the configuration of the display data and/or the touch data in the data signal TVOP and the data signal TVON. For example, when the data content after the indicator includes both the display data and the touch data, the present disclosure performs a first pulse width modulation on the indicator. For example, when the data content after the indicator are all touch data, the present disclosure performs a second pulse width modulation on the indicator. The first pulse width modulation is different from the second pulse width modulation.

In the touch display device 100 of the present disclosure, the driving circuit board includes a first interface and a second interface according to some embodiments. The first interface may receive the display data from the timing-control circuit board, and the second interface may output the touch data to the timing-control circuit board. The first interface and the second interface are differential signal interfaces, which can greatly reduce power consumption and electromagnetic interference (EMI) problems during data transmission. According to some embodiments, the processing chip 108 receives the first display data 130 from the timing-control circuit board 106 in the form of differential signals through the first interface 120 thereof. On the other hand, the processing chip 108 also outputs the first touch data 132 to the timing control circuit board 106 in the form of differential signals through the second interface 122 thereof. In detail, since the data transmission between the processing chip 108 and the microcontroller 110 in the timing-control circuit board 106 uses differential signals, the power consumption and electromagnetic interference (EMI) problems during the data transmission process can be greatly reduced.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A touch display device, comprising:
a touch display panel;
a timing-control circuit board, configured to output first display data; and
a first driving circuit board, electrically coupled between the touch display panel and the timing-control circuit board;
wherein the first driving circuit board comprises:
a first interface, configured to receive the first display data from the timing-control circuit board;
a second interface, configured to output first touch data to the timing-control circuit board;

wherein the first interface and the second interface are differential signal interfaces; and wherein during a clock period of a clock signal from the timing-control circuit board, a data signal carries the first touch data, and wherein the differential signal interfaces are configured to transmit either the first display data or the first touch data or the both through a pair of clock signals and at least one pair of data signals.

2. The touch display device as claimed in claim 1, wherein the first interface and the second interface are a point-to-point interface, a low voltage differential signal (LVDS) interface, or an embedded display port interface.

3. The touch display device as claimed in claim 2, wherein either the first interface or the second interface serves as the point-to-point interface, and the other serves as the LVDS interface.

4. The touch display device as claimed in claim 1, wherein the touch display panel further comprises a second driving circuit board, a first part and a second part; the first driving circuit board outputs a first display-driving signal to the first part of the touch display panel, and the second driving circuit board outputs a second display-driving signal to the second part of the touch display panel.

5. The touch display device as claimed in claim 1, wherein the at least one pair of data signals are configured to carry the first touch data.

6. The touch display device as claimed in claim 1, further comprising:

a processing chip, disposed on the first driving circuit board;

wherein the processing chip converts a touch signal from the touch display panel into the first touch data, and sends the first touch data to the timing-control circuit board.

7. The touch display device as claimed in claim 6, wherein the processing chip converts the first display data from the timing-control circuit board into a display-driving signal, and sends the display-driving signal to the touch display panel.

8. The touch display device as claimed in claim 1, wherein the touch display panel further comprises a second driving circuit board, and the second driving circuit board is electrically connected to the timing-control circuit board through a flexible cable.

9. The touch display device as claimed in claim 1, wherein the first driving circuit board is configured to convert the first display data from the timing-control circuit board into a display-driving signal through the first interface, and is configured to send the display-driving signal to the touch display panel.

10. The touch display device as claimed in claim 1, further comprising:

a second driving circuit board, electrically coupled between the touch display panel and the timing-control circuit board;

wherein the second driving circuit board comprises:

a third interface, configured to receive the second display data from the timing-control circuit board;

a fourth interface, configured to output second touch data to the timing-control circuit board;

wherein the third interface and the fourth interface are differential signal interfaces.

11. The touch display device as claimed in claim 10, wherein the third interface and the fourth interface are a point-to-point interface, a low voltage differential signal (LVDS) interface, or an embedded display port interface.

12. The touch display device as claimed in claim 10, wherein the second driving circuit board is electrically coupled to the first driving circuit board.

13. The touch display device as claimed in claim 10, wherein during the clock period, the third interface and the fourth interface are configured to transmit the second touch data through a pair of clock signals and at least one pair of data signals.

14. The touch display device as claimed in claim 13, wherein the at least one pair of data signals are configured to carry the second touch data.

15. The touch display device as claimed in claim 1, wherein during the clock period of the clock signal from the timing-control circuit board, the data signal carries the first touch data and the first display data.

16. The touch display device as claimed in claim 1, wherein during the clock period of the clock signal from the timing-control circuit board, the data signal and another data signal carry the first touch data.

17. The touch display device as claimed in claim 1, wherein the data signal is configured to carry an indicator, and the indicator indicates the configuration of either the first display data or the first touch data or the both in the data signal.

* * * * *